(12) United States Patent
Zhang et al.

(10) Patent No.: US 8,098,152 B2
(45) Date of Patent: *Jan. 17, 2012

(54) UNIVERSAL DISPLAY EXPOSURE MONITOR USING PERSONAL LOCATOR SERVICE

(75) Inventors: Jack K. Zhang, Ijamsville, MD (US); Jack C. Crystal, Owings Mill, MD (US); James M. Jensen, Columbia, MD (US); Eugene L. Flanagan, III, Wilton, CT (US)

(73) Assignee: Arbitron Inc., Columbia, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/563,582

(22) Filed: Sep. 21, 2009

(65) Prior Publication Data

US 2010/0033322 A1 Feb. 11, 2010

Related U.S. Application Data

(63) Continuation of application No. 10/640,104, filed on Aug. 13, 2003, now Pat. No. 7,592,908.

(51) Int. Cl.
 *G08B 1/08* (2006.01)
(52) U.S. Cl. ................................................... 340/539.13
(58) Field of Classification Search ............. 340/539.13, 340/573.1, 426.19, 825.49, 825.69; 342/457, 342/357.06; 705/1, 7, 10
See application file for complete search history.

(56) References Cited

U.S. PATENT DOCUMENTS

| | | | | |
|---|---|---|---|---|
| 5,461,390 | A | * | 10/1995 | Hoshen ......................... 342/419 |
| 6,571,279 | B1 | * | 5/2003 | Herz et al. ..................... 709/217 |
| 6,720,876 | B1 | * | 4/2004 | Burgess ....................... 340/568.1 |
| 6,774,797 | B2 | * | 8/2004 | Freathy et al. ............. 340/573.1 |
| 2003/0055707 | A1 | * | 3/2003 | Busche et al. .................. 705/10 |
| 2003/0097302 | A1 | * | 5/2003 | Overhultz et al. .............. 705/14 |
| 2003/0122708 | A1 | * | 7/2003 | Percy et al. .............. 342/357.07 |
| 2003/0171975 | A1 | * | 9/2003 | Kirshenbaum et al. ......... 705/10 |

\* cited by examiner

*Primary Examiner* — Phung Nguyen
(74) *Attorney, Agent, or Firm* — Barnes & Thornburg LLP; Peter Zura

(57) ABSTRACT

Systems, methods and devices for gathering data concerning exposure of predetermined survey participants to media displays are provided. A portable monitor is arranged to receive certain types of terrestrial-based signals, and in some specific cases, satellite-based signals, and to use such signals to generate location data indicative of a location of the portable monitor. The location data and stored media display data is analyzed to evaluate the survey participant's exposure to one or more media displays.

16 Claims, 11 Drawing Sheets

UNIVERSAL DISPLAY EXPOSURE MONITOR USING PERSONAL LOCATOR SERVICE

CROSS-REFERENCE TO RELATED APPLICATION

This application is a continuation of prior U.S. non-provisional patent application Ser. No. 10/640,104, filed Aug. 13, 2003 now U.S. Pat. No. 7,592,908, assigned to the assignee of the present invention and hereby incorporated herein by reference in its entirety.

TECHNICAL FIELD

The present invention generally relates to systems, methods and devices for measuring the exposure of predetermined survey participants to media displays.

BACKGROUND INFORMATION

It is desired to estimate the exposure of persons to media displays which are often displayed in outdoor settings, such as along roads, highways, railways and walkways, as well as in various indoor settings, such as in malls, subway stations, railway stations, bus stations, airports, building lobbies, etc. Moreover, in addition to information concerning the numbers of persons exposed to such media displays, information concerning the days and times such exposure takes place and information concerning the particular individuals so exposed is also highly desired.

It has been proposed to employ global positioning satellite (GPS) systems to track the positions of persons during a period of time, and then to compare the paths of the tracked persons with the known locations of billboards in order to determine which billboards the tracked persons passed by.

This proposed technique, however, suffers from a number of disadvantages. One such disadvantage is that the technique is limited to outdoor use only due to the drastic weakening of GPS signals caused by building structures and the like. As such, the exposure to media displays displayed in indoor settings, such as in malls, subway stations, railway stations, bus stations, airports, building lobbies, etc., cannot be accurately measured using this proposed system. A related disadvantage is that the GPS signals may become weakened when the persons being monitored are traveling in vehicles, such as cars, trucks, buses, trains and the like. As such, the accurate measurement of exposure to even outdoor media displays may not always be possible using this proposed system.

Still another disadvantage of the proposed GPS system is that GPS systems may be costly to implement or maintain. The cost of the electronics required to receive the GPS signals and to convert those GPS signals into location data may be prohibitive, particularly when surveys designed for a large survey population are desired. Moreover, the physical size and weight of the electronics required to receive, process and store the GPS signals may also be prohibitive, since the device must be carried on the person of survey participants at all times for accurate results.

Yet another disadvantage of the proposed GPS system is that although the proposed system may include a monitor having a motion detector for shutting the monitor down when the monitor is not moving (for example, when it is taken off the survey participant during sleep or the like), the monitor is substantially continuously monitoring for location data when the survey participant is moving around. This may not be necessary, for example when the survey participant is in an area with no media displays, and unnecessarily decreases battery life, requiring replacement or recharging of the batteries at shorter intervals.

Each embodiment of the present invention, as discussed in more detail below, obviates at least some of the disadvantages of the proposed GPS system.

SUMMARY OF THE INVENTION

For this application the following terms and definitions shall apply, both for the singular and plural forms of nouns and for all verb tenses:

The term "data" as used herein means any indicia, signals, marks, symbols, domains, symbol sets, representations and any other physical form or forms representing information, whether permanent or temporary, whether visible, audible, acoustic, electric, magnetic, electromagnetic or otherwise manifested. The term "data" as used herein to represent certain information in one physical form shall be deemed to encompass any and all representations of the same information in a different physical form or forms.

The term "media data" as used herein means data which is widely accessible, whether optically observable, over-the-air, or via cable, satellite, network, internetwork (including the Internet), distributed on storage media, or otherwise, without regard to the form or content thereof.

The term "transmitter" as used herein means any device which radiates or distributes a signal, whether optical, acoustic, electric, magnetic, electromagnetic or otherwise manifested.

The term "receiver" as used herein means any device which acquires a signal, whether optical, acoustic, electric, magnetic, electromagnetic or otherwise manifested.

The terms "coupled", "coupled to" and "coupled with" as used herein each means a relationship between or among two or more devices, apparatus, files, programs, media, components, networks, systems, subsystems and/or means, constituting any one or more of (a) a connection whether direct or through one or more other devices, apparatus, files, programs, media, components, networks, systems, subsystems or means, (b) a communications relationship whether direct or through one or more other devices, apparatus, files, programs, media, components, networks, systems, subsystems, or means, or (c) a functional relationship in which the operation of any one or more thereof depends, in whole or in part, on the operation of any one or more others thereof.

The terms "communicate" and "communication" as used herein include both conveying data from a source to a destination, and delivering data to a communications medium, system or link to be conveyed to a destination.

The term "processor" as used herein means processing devices, apparatus, programs, circuits, systems and subsystems, whether implemented in hardware, software or both and whether for processing analog and/or digital data.

In accordance with an aspect of the present invention, a method for measuring the exposure of a survey participant to a media display comprises the steps of: generating location data indicative of a location of a portable monitor arranged to be carried on the person of the survey participant based upon a technique comprising at least one of an angle of arrival technique, a time difference of arrival technique, an enhanced signal strength technique, a location fingerprinting technique, and an ultra wideband location technique; and analyzing the location data and stored media display data to evaluate the survey participant's exposure to one or more media displays.

In some embodiments, the generating step is performed periodically or from time to time. In some embodiments, the method further comprises the step of receiving a monitor enabling signal when the portable monitor is in the vicinity of one or more media displays, and the generating step is performed only when the monitor enabling signal is received.

In some embodiments, the generating step comprises the steps of: generating, with a vehicle monitor arranged to be carried in or on a vehicle, location data indicative of a location of the vehicle based upon a technique comprising at least one of an angle of arrival technique, a time difference of arrival technique, an enhanced signal strength technique, a location fingerprinting technique, and an ultra wideband location technique; and receiving the location data from the vehicle monitor with a portable monitor arranged to be carried on the person of the survey participant.

In some embodiments, the analyzing step is performed by the portable monitor. In some embodiments, the method further comprises the step of transmitting the location data to a processing system, and the analyzing step is performed by the processing system.

In accordance with another aspect of the present invention, a method for measuring the exposure of a survey participant riding in a vehicle to a media display comprises the steps of: generating, with a vehicle monitor arranged to be carried in or on the vehicle, location data indicative of a location of the vehicle monitor; receiving the location data from the vehicle monitor with a portable monitor arranged to be carried on the person of the survey participant; and analyzing the location data and stored media display data to evaluate the survey participant's exposure to one or more media displays.

In some embodiments, the generating step employs satellite-based signals in order to generate the location data. In certain of these embodiments, the satellite-based signals comprise global positioning system signals. In some embodiments, the generating step employs terrestrial-based signals in order to generate the location data. In certain of these embodiments, the generating step employs a technique comprising at least one of an angle of arrival technique, a time difference of arrival technique, an enhanced signal strength technique, a location fingerprinting technique, and an ultra wideband location technique in order to generate the location data.

In some embodiments, the receiving step is performed periodically or from time to time. In some embodiments, the method further comprises the step of receiving a monitor enabling signal when the portable monitor is in the vicinity of one or more media displays, and the receiving the location data step is performed only when the monitor enabling signal is received.

In some embodiments, the analyzing step is performed by the portable monitor. In some embodiments, the method further comprises the step of transmitting the location data to a processing system, and the analyzing step is performed by the processing system. In some embodiments the method further comprises the step of receiving, with the portable monitor, media exposure data indicative of the survey participant's exposure to media data other than a media display or media displays. In certain of these embodiments, the media exposure data is indicative of the survey participant's exposure to radio, television and/or streaming media data.

In accordance with another aspect of the present invention, a method for measuring the exposure of a survey participant to a media display comprises the steps of: receiving, with a media display location receiver/transmitter on or adjacent the media display, position indicative signals; generating and transmitting, with the media display location receiver/transmitter, media display location data at least in part based upon the received position indicative signals; and receiving the media display location data from the media display location receiver/transmitter with a portable monitor arranged to be carried on the person of the survey participant.

In some embodiments, the position indicative signals comprise satellite-based signals. In certain of these embodiments, the satellite-based signals comprise global positioning system signals. In some embodiments, the position indicative signals comprise terrestrial-based signals. In certain of these embodiments, the generating and transmitting step employs a technique comprising at least one of an angle of arrival technique, a time difference of arrival technique, an enhanced signal strength technique, a location fingerprinting technique, and an ultra wideband location technique in order to generate the media display location data.

In some embodiments, the method further comprises the step of receiving a monitor enabling signal when the portable monitor is in the vicinity of one or more media displays, and wherein the receiving the media display location data step is performed only when the monitor enabling signal is received. In some embodiments, the method further comprises the step of analyzing the media display location data to evaluate the survey participant's exposure to one or more media displays. In certain of these embodiments, the analyzing step is performed by the portable monitor. In certain of these embodiments, the method further comprises the step of transmitting the media display location data to a processing system, and wherein the analyzing step is performed by the processing system. In some embodiments, the media display location data is transmitted at a different frequency than, in a different format than, or both at a different frequency than and in a different format than the position indicative signals. In some embodiments, the media display location data is transmitted acoustically.

In accordance with yet another aspect of the present invention, a method for measuring the exposure of a survey participant to a media display comprises the steps of: receiving location signals from a server assisted satellite positioning system; generating location data indicative of a location of a portable monitor arranged to be carried on the person of the survey participant based upon the received location signals; and analyzing the location data and stored media display data to evaluate the survey participant's exposure to one or more media displays.

In some embodiments, the receiving and generating steps are performed periodically or from time to time. In some embodiments, the method further comprises the step of receiving a monitor enabling signal when the portable monitor is in the vicinity of one or more media displays, and the receiving location signals step and the generating step are performed only when the monitor enabling signal is received. In some embodiments, the generating step comprises the steps of: generating, with a vehicle monitor arranged to be carried in or on a vehicle, location data indicative of a location of the vehicle based upon the received location signals; and receiving the location data from the vehicle monitor with a portable monitor arranged to be carried on the person of the survey participant. In some embodiments, the analyzing step is performed by the portable monitor. In some embodiments, the method further comprises the step of transmitting the location data to a processing system, and the analyzing step is performed by the processing system.

In accordance with still another aspect of the present invention, a method for measuring the exposure of a survey participant to a media display comprises the steps of: generating location data indicative of a location of a portable monitor arranged to be carried on the person of the survey participant, the location data being based upon signals generated by an inertial monitoring unit; and analyzing the location data and stored media display data to evaluate the survey participant's exposure to one or more media displays.

In some embodiments, the method further comprises the step of calibrating the inertial monitoring unit based upon location signals received by the inertial monitoring unit. In some embodiments, the location signals comprise satellite-based location signals. In certain of these embodiments, the satellite-based location signals comprise global positioning system location signals. In some embodiments, the location signals comprise terrestrial-based location signals. In some embodiments, the calibrating step is performed periodically or from time to time. In some embodiments, the calibrating step is performed whenever the location signals are received.

In some embodiments, the generating step is performed periodically or from time to time. In some embodiments, the method further comprises the step of receiving a monitor enabling signal when the portable monitor is in the vicinity of one or more media displays, and the generating step is performed only when the monitor enabling signal is received. In some embodiments, the generating step comprises the steps of: generating, with a vehicle monitor arranged to be carried in or on a vehicle, location data indicative of a location of the vehicle based upon signals generated by an inertial monitoring unit; and receiving the location data from the vehicle monitor with a portable monitor arranged to be carried on the person of the survey participant. In some embodiments, the analyzing step is performed by the portable monitor. In some embodiments, the method further comprises the step of transmitting the location data to a processing system, and the analyzing step is performed by the processing system.

In accordance with yet a further aspect of the present invention, a method for measuring the exposure of a survey participant riding in a vehicle to a media display comprises the steps of: generating, with a vehicle monitor arranged to be carried in or on the vehicle, location data indicative of a location of the vehicle monitor; analyzing the location data and stored media display data to generate exposure data indicative of the survey participant's exposure to one or more media displays; and receiving the exposure data from the vehicle monitor with a portable monitor arranged to be carried on the person of the survey participant.

In some embodiments, the generating step employs satellite-based signals in order to generate the location data. In certain of these embodiments, the satellite-based signals comprise global positioning system signals. In some embodiments, the generating step employs terrestrial-based signals in order to generate the location data. In certain of these embodiments, the generating step employs a technique comprising at least one of an angle of arrival technique, a time difference of arrival technique, an enhanced signal strength technique, a location fingerprinting technique, and an ultra wideband location technique in order to generate the location data.

In some embodiments, the receiving step is performed periodically or from time to time. In some embodiments, the method further comprises the step of receiving a monitor enabling signal when the portable monitor is in the vicinity of one or more media displays, and the receiving the exposure data step is performed only when the monitor enabling signal is received. In some embodiments, the method further comprises the step of transmitting the exposure data to a processing system. In some embodiments, the method further comprises the step of receiving media exposure data indicative of the survey participant's exposure to a media other than a media display or media displays. In certain of these embodiments, the media exposure data is indicative of the survey participant's exposure to radio, television and/or streaming media.

In still yet a further aspect of the present invention, a method for measuring the exposure of a survey participant to a media display comprises the steps of: gathering location data of the survey participant within an area including an exposure area of the media display; at a location of the survey participant, processing the location data with media display location data to produce media display exposure data indicating exposure of the survey participant to the media display; and communicating the media display exposure data to a media exposure estimate producing system for producing media exposure data.

In some embodiments, a portable monitor carried on the person of the survey participant processes the location data to produce the media display exposure data. In some embodiments, a vehicle monitor carried in or on a vehicle in which the survey participant is riding processes the location data to produce the media display exposure data. In some embodiments, a processor located in a household of the survey participant processes the location data to produce the media display exposure data.

In yet still another aspect of the present invention, a system for measuring the exposure of a survey participant to a media display, comprises: a portable media monitor arranged to be carried on the person of the survey participant, the portable media monitor being operative to generate location data indicative of a location of the survey participant based upon a technique comprising at least one of an angle of arrival technique, a time difference of arrival technique, an enhanced signal strength technique, a location fingerprinting technique, and an ultra wideband location technique; and a processor, the processor being operative to analyze the location data and stored media display data to evaluate the survey participant's exposure to one or more media displays.

In still another aspect of the present invention, a system for measuring the exposure of a survey participant riding in a vehicle to a media display comprises: a vehicle monitor arranged to be carried in or on the vehicle, the vehicle monitor being operative to generate location data indicative of a location of the vehicle monitor; a portable monitor arranged to be carried on the person of the survey participant, the portable monitor being operative to receive the location data from the vehicle monitor; and a processor, the processor being operative to analyze the location data and stored media display data to evaluate the survey participant's exposure to one or more media displays.

In a further aspect of the present invention, a system for measuring the exposure of a survey participant to a media display comprises: a media display location receiver/transmitter on or adjacent the media display, the media display location receiver/transmitter being operative to receive position indicative signals, and to generate and transmit media display location data at least in part based upon the received position indicative signals; and a portable monitor arranged to be carried on the person of the survey participant, the portable monitor being operative to receive the media display location data from the media display location receiver/transmitter.

In yet another aspect of the present invention, a system for measuring the exposure of a survey participant to a media display comprises: a portable monitor arranged to be carried on the person of the survey participant, the portable monitor being operative to receive location signals from a server assisted satellite positioning system, and to generate location data indicative of a location of the survey participant based upon the received location signals; and a processor, the processor being operative to analyze the location data and stored media display data to evaluate the survey participant's exposure to one or more media displays.

In still a further aspect of the present invention, a system for measuring the exposure of a survey participant to a media display comprises: a portable monitor arranged to be carried on the person of the survey participant, the portable monitor comprising an inertial monitoring unit, and the portable monitor being operative to generate location data indicative of a location of the survey participant based upon signals generated by the inertial monitoring unit; and a processor, the processor being operative to analyze the location data and stored media display data to evaluate the survey participant's exposure to one or more media displays.

In still yet a further aspect of the present invention, a system for measuring the exposure of a survey participant riding in a vehicle to a media display comprises: a vehicle monitor arranged to be carried in or on the vehicle, the vehicle monitor being operative to generate location data indicative of a location of the vehicle monitor, and to analyze the location data and stored media display data to generate exposure data indicative of the survey participant's exposure to one or more media displays; and a portable monitor arranged to be carried on the person of the survey participant, the portable monitor being operative to receive the exposure data from the vehicle monitor.

In accordance with still a further aspect of the invention, a system for measuring the exposure of a survey participant to a media display comprises: a receiver operative to gather location data representing a location of the survey participant within an area including an exposure area of the media display; a processor at a location of the survey participant and coupled with the receiver to receive the location data, the processor being operative to process the location data with media display location data to produce media display exposure data indicating exposure of the survey participant to the media display; and a communications device coupled with the processor to communicate the media display exposure data to a media exposure estimate producing system for producing media exposure data.

In some embodiments, the processor is included in a portable monitor carried on the person of the survey participant. In some embodiments, the processor is included in a vehicle monitor carried in or on a vehicle in which the survey participant is riding. In some embodiments, the processor is located in a household of the survey participant.

The invention and its particular features and advantages will become more apparent from the following detailed description considered with reference to the accompanying drawings.

DETAILED DESCRIPTION OF CERTAIN ADVANTAGEOUS EMBODIMENTS

Figure 1:
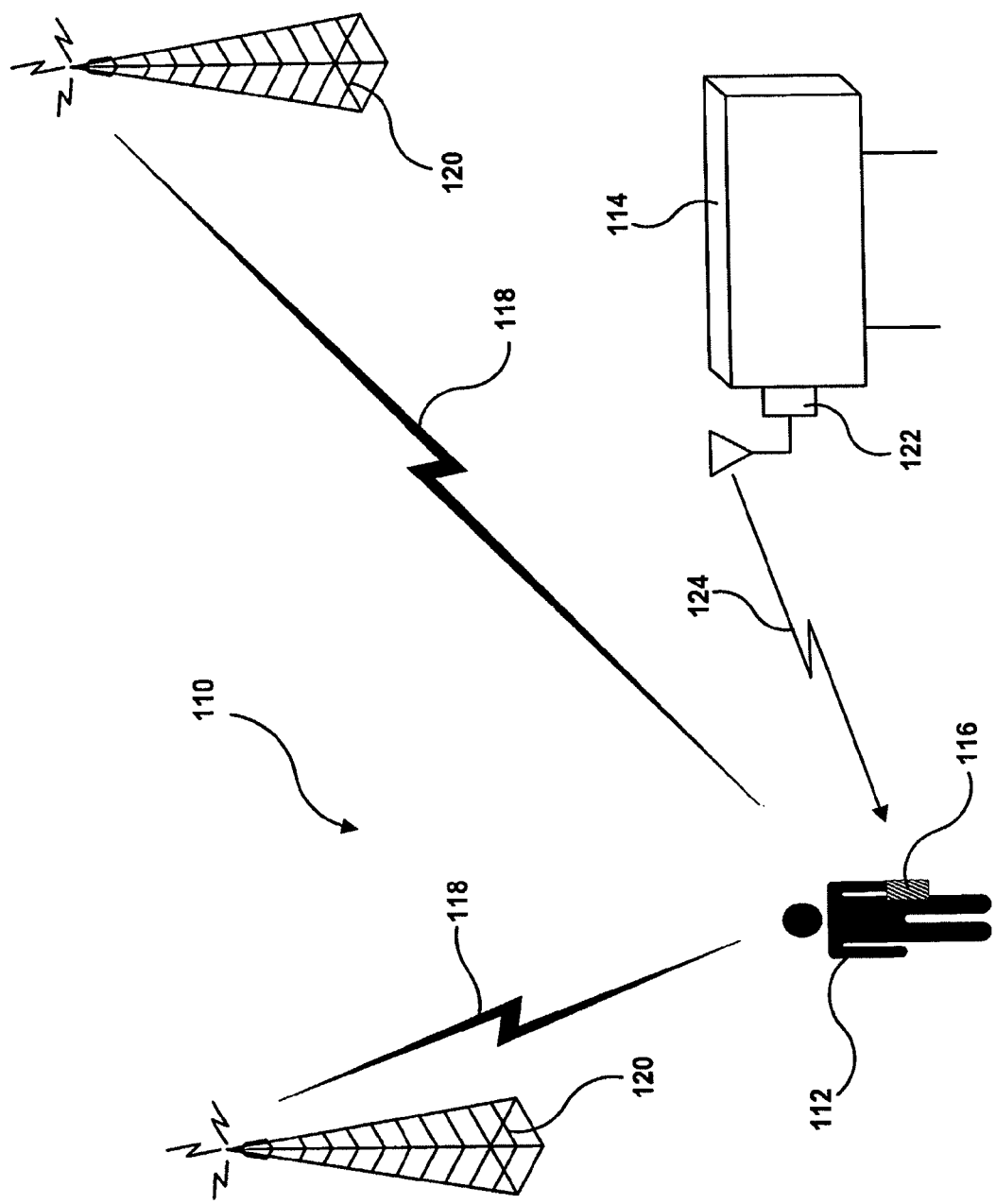
FIG. 1 is a schematic diagram illustrating a system and method for measuring the exposure of a survey participant to a media display in accordance with certain embodiments of the present invention.

FIG. 1 schematically illustrates a system 110 for measuring the exposure of a survey participant 112 to a media display 114 in accordance with certain embodiments of the present invention. System 110 includes a portable monitor 116 arranged to be carried on the person of the survey participant 112. The portable monitor 116 receives one or more signals 118 from one or more terrestrial sources 120 and generates location data indicative of a location of the portable monitor 116 based upon the signals 118. More particularly, the portable monitor 116 employs at least one of the following techniques to generate the location data based upon the signals 118: an angle of arrival (AOA) technique, a time difference of arrival (TDOA) technique, an enhanced signal strength (ESS) technique, a location fingerprinting technique, and an ultra wideband location technique. Each of these techniques is now briefly described.

The angle of arrival (AOA) technique determines the direction of a signal received from a radio frequency (RF) transmitter. This can be done by pointing a directional antenna along the line of maximum signal strength. Alternatively, signal direction can be determined from the difference in time of arrival of the incoming signals at different elements of the antenna. A two-element antenna is typically used to cover angles of .+-.60 degrees. To achieve 360-degree coverage, a six-element antenna can be used. However, a single mobile directional antenna can give only the bearing, not the position, of a transmitting object.

With two directional antennas spaced well apart, however, the position of a transmitting device in a plane can be computed. In this method, also known as the angle of arrival (AOA) method, transmitter position is determined from the known (fixed) position of the receivers' antennas and the angle of arrival of the signals with respect to the antennas. In certain embodiments the portable monitor 116 includes a transmitter that enables its location to be determined in accordance with the angle of arrival method.

The time difference of arrival (TDOA) technique is based upon the similar concept that the difference in time of arrival between signals received at geographically disparate antennas can be used to determine position. Given the speed of light and known transmit and receive times, the distance between the mobile locator and receiver antenna can be calculated. In certain embodiments the portable monitor 116 includes a transmitter that enables its location to be determined in accordance with the time difference of arrival technique.

In an alternative time difference scheme, the locator and the antennas reverse roles: the antennas are transmitters and the mobile locator is a receiver. This technique is known as forward link trilateration (FLT). This is relatively simple to implement in some code-division multiple access (CDMA) wireless systems, where the time difference of arrival can be determined from the phase difference between pseudo-random noise code sequences of 0s and 1s transmitted from two antennas. In certain embodiments the portable monitor 116 includes a receiver, such as a CDMA cellular telephone receiver, that enables its location to be determined in accordance with the forward link trilateration method.

When the term "time difference of arrival technique" is used herein, the term is meant to encompass both the traditional time difference of arrival (TDOA) method and the forward link trilateration (FLT) method.

The enhanced signal strength (ESS) method provides improvements over conventional signal strength methods by overcoming such impediments as multipath effects, attenuation, and antenna orientation. The method involves taking in three-dimensional information on the lay of the land, buildings, elevated highways, railroads, and other obstructions, and using such information to simulate the RF signal propagation characteristics of wireless transmitting antennas in an area where the location of a mobile transmitter is to be determined. A location system center stores the results in an RF database. The position of a mobile locator is determined by getting it to measure the signal strength of preferably three to five base stations. From this input plus information from the base stations' databases, the system can calculate the position of the locator. Inside large public buildings, such as malls, subway and train stations, stadiums and arenas with appropriate base stations located therein, the proximity of a locator in the vicinity of a given media display can be determined by means of the ESS method. In certain embodiments the portable monitor 116 includes a receiver that enables its location to be determined in accordance with the ESS method.

The location fingerprinting technique, instead of exploiting signal timing or signal strength, relies on signal structure characteristics. The technique turns the multipath phenomenon to good use by combining the multipath pattern with other signal characteristics, to create a signature unique to a given location. A location fingerprinting system includes a signal signature database of a location grid for a specific service area. To generate this database, a vehicle drives through the coverage area transmitting or receiving signals to or from a monitoring site. The system analyzes the incoming signals, compiles a unique signature for each square in the location grid, and stores it in the database.

To determine the position of a mobile transmitter or receiver, the system matches the transmitter's or receiver's signal signature to an entry in the database. Multipoint signal reception is not required, although it is preferable. The system can use data from only a single point to determine location. Moving traffic, including vehicles, animals, and/or people, and changes in foliage or weather do not affect the system's capabilities. In certain embodiments the portable monitor 116 includes a transmitter or a receiver that enables its location to be determined in accordance with the location fingerprinting technique.

In certain ultra wideband location techniques a network of localizers determine relative locations in three-dimensional space by measuring propagation times of pseudorandom sequences of electromagnetic impulses. The propagation time is determined from a correlator which provides an analog pseudo-autocorrelation function sampled at discrete time bins. The correlator has a number of integrators, each integrator providing a signal proportional to the time integral of the product of the expected pulse sequence delayed by one of the discrete time bins, and the non-delayed received antenna signal. Using pattern recognition the arrival time of the received signal can be determined to within a time much smaller than the separation between bins.

In certain ultra wideband techniques, wireless ultra wideband transceivers are positioned at known stationary locations within an area to be monitored, and the portable monitor 116 includes a wireless ultra wideband receiver/processor that receives one or more timed pulses from the various transceivers and resolves the location of the portable monitor within the monitored area based on the locations of the ultra wideband transceivers and time-of-flight measurements of the pulse or pulses. In certain embodiments, the portable monitor 116 includes an ultra wideband transmitter and a plurality of interacting receivers in stationary positions receive a pulse from the transmitter of the portable monitor 116 to determine its location. In certain of the embodiments, the stationary transceivers or receivers are coupled by cabling, while in others they are untethered.

In certain embodiments location data is generated by the portable monitor 116 based upon signals 118 transmitted from the terrestrial sources 120 in accordance with a selected one of the location methods described above. In certain embodiments location data is generated instead based upon signals transmitted from the portable monitor 116 to one of more base stations (not shown for purposes of simplicity and clarity) in accordance with a selected one of the location methods described above. In all such embodiments, the location data are analyzed in conjunction with stored media display data to evaluate the exposure of the survey participant 112 to one or more media displays 114. This analysis may be performed by the portable monitor 116, and/or by a processing system to which the portable monitor 116 or the one or more base stations have communicated the location data.

In certain embodiments, the analysis is performed by a processor (not shown for purposes of simplicity and clarity) located in a household of the survey participant, from location data downloaded thereto by the portable monitor 116. The processor may be embodied either in a base station for the portable monitor 116 or in a hub which serves to communicate data to and from one or more such base stations to a remotely located media exposure estimate producing system. While it is possible for the location data to be communicated to the media exposure estimate producing system and analyzed thereby, in some embodiments, it may be preferable that the analysis be performed in the portable monitor, the base station, or the hub and that only analyzed media display exposure data be communicated to the media exposure estimate producing system, as such an arrangement provides certain privacy-related advantages. Rather than communicating the location of survey participants to the media exposure estimate producing system (which some survey participants may find to be intrusive), only information concerning media displays to which the survey participants were exposed would be communicated. As such, persons concerned with maintaining their privacy may be more likely to participate as survey participants. The processes of generating and analyzing the location data are described in more detail below.

In order to conserve battery life of the portable monitor 116 some embodiments of system 110 employ certain power conservation techniques. In one exemplary technique, the location data is generated by the portable monitor 116 only periodically or from time to time as opposed to continuously. During the periods between such location data generation, the portable monitor 116 uses a reduced amount of power, and battery life is prolonged, thereby increasing the length of time between battery replacements or recharging.

In another exemplary power conservation technique, the system 110 includes a transmitter 122 which transmits a monitor enabling signal 124 with a limited range. The transmitter 122 is positioned such that, and the monitor enabling signal 124 has a range such that, the portable monitor 116 only receives the monitor enabling signal 124 when the portable monitor 116 is in the vicinity of one or more media displays 114. The location determining function of the portable monitor 116 is enabled (i.e., location data is generated by the portable monitor 116) only when the monitor enabling signal 124 is received by the portable monitor 116. More specifically, the location determining function of the portable monitor 116 is normally in a dormant state, but when in receipt of the monitor enabling signal 124, the portable monitor 116 enables the location determining function. Thus, at times when the survey participant 112 is not in the vicinity of a media display 114 (at which times, the location of the survey participant is not of particular interest anyway), power is not wasted generating location data, and power is only expended generating location data when the location of the survey participant 112 is of interest.

In certain advantageous embodiments, the monitor enabling signal 124 is transmitted wirelessly from the transmitter 122 to the portable monitor 116, such as by RF, infrared or acoustic signaling. A particularly advantageous technique for those circumstances where exposure of pedestrians to nearby media displays is measured employs acoustic signaling by means of acoustic energy that is masked by ambient acoustic energy sensed by the transmitter 122. The transmitter selectively sets the magnitudes of the acoustic signals so that the acoustic signals are masked by the ambient acoustic energy, in accordance with the techniques disclosed in U.S. Pat. No. 5,764,763 to Jensen et al. which is assigned to the assignee of the present application and which is incorporated herein by reference in its entirety.

The monitor enabling signal 124 is the same without regard to the particular media display or displays 114 in which the portable monitor 116 is in the vicinity. In certain embodiments, the transmitter 122 is located proximate to the media display 114. In certain embodiments, the transmitter 122 is located in the vicinity of multiple media displays. In some embodiments, the transmitter 122 may have directional capabilities such that the monitor enabling signal 124 is received only by portable monitors 116 carried by survey participants traveling in certain directions.

In addition to conserving power, the above-described technique of employing a monitor enabling signal 124 which enables the location determining function of the portable monitor 116 provides certain privacy-related advantages. Rather than tracing the location of survey participants wherever they go (which some survey participants may find to be intrusive), the location of the survey participants would be recorded only when they are in the vicinity of one or more media displays. As such, persons concerned with maintaining their privacy may be more likely to participate as survey participants.

Figure 2:
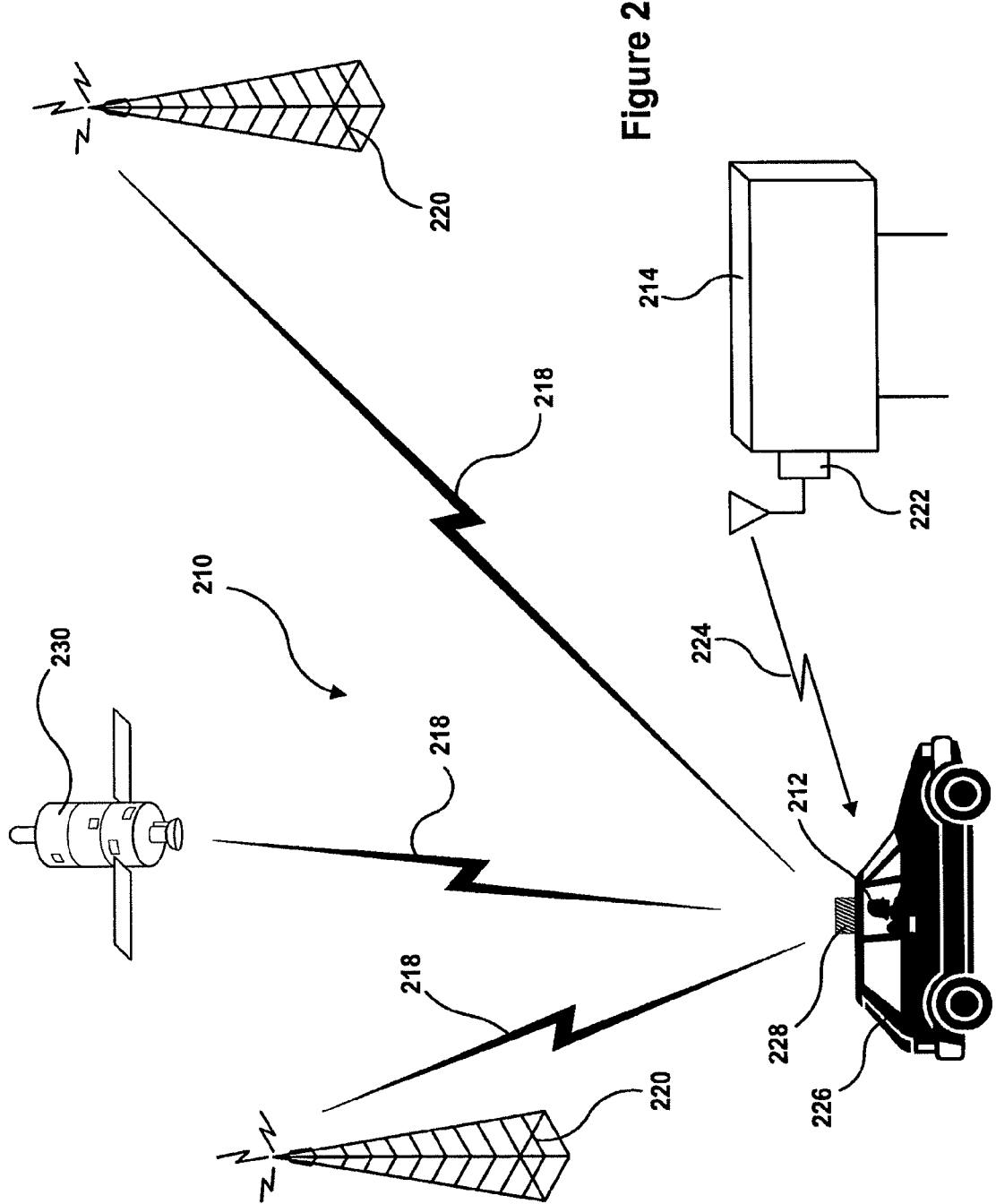
FIG. 2 is a schematic diagram illustrating a system and method for measuring the exposure of a survey participant to a media display in accordance with certain embodiments of the present invention.

Referring now to FIG. 2 a system 210 for measuring the exposure of a survey participant 212 riding in a vehicle 226 to a media display 214 in accordance with certain embodiments of the present invention is schematically shown. System 210 includes a vehicle monitor 228 arranged to be carried in or on the vehicle 226 and a portable monitor (not shown in FIG. 2 for purposes of simplicity and clarity) arranged to be carried on the person of the survey participant 212 riding in the vehicle 226. Of course, there may be two or more survey participants 212 riding in the vehicle 226, each carrying a portable monitor. The vehicle 226 may comprise a private vehicle, such as an automobile, a truck, a van, a motorcycle, a bicycle, a scooter, or the like, or may comprise a public vehicle, such as a train, a bus, a subway car, an airplane, a monorail or the like.

In certain advantageous embodiments, the location data is transmitted wirelessly from the vehicle monitor 228 to the portable monitor, such as by RF, infrared or acoustic signaling. A particularly advantageous technique employs acoustic signaling by means of acoustic energy that is masked by ambient acoustic energy sensed by the vehicle monitor 228. The vehicle monitor selectively sets the magnitudes of the acoustic signals so that the acoustic signals are masked by the ambient acoustic energy, in accordance with the techniques disclosed in U.S. Pat. No. 5,764,763 to Jensen et al. which is assigned to the assignee of the present application and which is incorporated herein by reference in its entirety.

The vehicle monitor 228 receives one or more signals 218 from one or more terrestrial sources 220 and/or satellite-based sources 230 and generates location data indicative of a location of the vehicle monitor 228 based upon the signals 218. The location data is transmitted by the vehicle monitor 228 and received by the portable monitor carried by the survey participant 212 riding in the vehicle. The location data generated by the vehicle monitor 228 based upon the signals 218 from the terrestrial sources 220 and/or satellite-based sources 230 are analyzed in conjunction with stored media display data to evaluate the exposure of the survey participant 212 to one or more media displays 214. This analysis may be performed by the vehicle monitor 228, the portable monitor, and/or by a processing system to which the portable monitor has communicated the location data. The processes of generating and analyzing the location data are described in more detail below.

The vehicle monitor 228 may employ satellite-based techniques, such as employing global positioning system (GPS) and/or server assisted GPS technology, and/or terrestrial techniques, such as employing an angle of arrival (AOA) technique, a time difference of arrival (TDOA) technique, an enhanced signal strength (ESS) technique, a location fingerprinting technique, and/or an ultra wideband location technique to generate the location data based upon the signals 218. The terrestrial techniques have been briefly described above and each of the satellite-based techniques is now briefly described.

The global positioning system (GPS) relies on a constellation of 24 satellites, and employs signal timing to determine position. The mobile locator is a receiver and the orbiting satellites are transmitters. The satellites transmit spread-spectrum signals on two frequency bands denoted L1 (1575.42 MHz) and L2 (1223.6 MHz). The signals are modulated by two pseudo-random noise codes, the P (precision) code and C/A (coarse/acquisition) code. The GPS signal is further modulated with a data message known as the GPS navigation message. Note that only the C/A code in the L1 band is used in civilian applications and hence is of interest here.

To acquire the satellites' signals, the GPS receiver generates a replica of the satellites' pseudo-random noise codes. The GPS navigation message can be demodulated only if the replica can be matched and synchronized with the pseudo-random noise codes received. If the receiver cannot match and synchronize its replica, the GPS signal appears to the receiver as noise. Matching the pseudo-random noise codes and using the satellites' navigation message also enables the receiver to calculate the signal transmit time as well as the coordinates of the satellites. To determine its position, a GPS receiver calculates its x, y, and z coordinates as well as the time the satellite signals arrive. Data must be acquired from at least four (and preferably more) observable GPS satellites.

Server-assisted GPS involves placing stationary servers throughout the area of coverage to assist mobile receivers to acquire the GPS signals. In effect, the servers are stationary GPS receivers that enhance the mobile GPS receiver's capabilities. The server includes a radio interface, for communicating with the mobile GPS receiver, and its own stationary GPS receiver, whose antenna has full view of the sky and monitors signals continuously from all the satellites within view.

To ask a mobile GPS receiver for its position, the server feeds it satellite information through the radio interface. Included in this information is a list of observable GPS satellites and other data that enable the mobile receiver to synchronize and match its pseudo-random noise code replicas with those of the satellites. Within about a second, the GPS receiver collects sufficient information for geolocation computation and sends the data back to the server. The server can then combine this information with data from the satellites' navigation message to determine the position of the mobile device. When a server-assisted GPS system is employed in certain embodiments according to FIG. 2, the server communicates the determined position to the vehicle monitor 228.

With the assisted GPS approach, the mobile receivers conserve power by not continuously tracking the satellites' signals. Moreover, they have only to track the pseudo-random noise code and not extract the satellites' navigation message from the signal, in effect becoming sensitive enough to acquire GPS signals inside most buildings. In addition, the assisted version of the technology attains greater accuracy. Because the actual position of the stationary GPS receiver is known, the difference between that and its measured position can be used to calculate a correction to the mobile receiver's position.

As with the system 110 described in FIG. 1, system 210 may optionally employ certain power conservation techniques in order to conserve battery life of the vehicle monitor 228 and/or the portable monitor. More-specifically, either of the exemplary techniques described above, involving the generation of location data periodically or from time to time and/or employing a transmitter 222 which transmits a monitor enabling signal 224 so that location data is produced only when the monitor enabling signal 224 is received, may be employed.

In certain embodiments, the portable monitor receives media exposure data indicative of the exposure of the survey participant 212 to a media other than the media display 214. For example. the media exposure data may be indicative of the exposure of the survey participant 212 to radio, television and/or streaming media. This media exposure data is analyzed along with the location data in order to generate combined exposure data as more fully described below.

Figure 3:
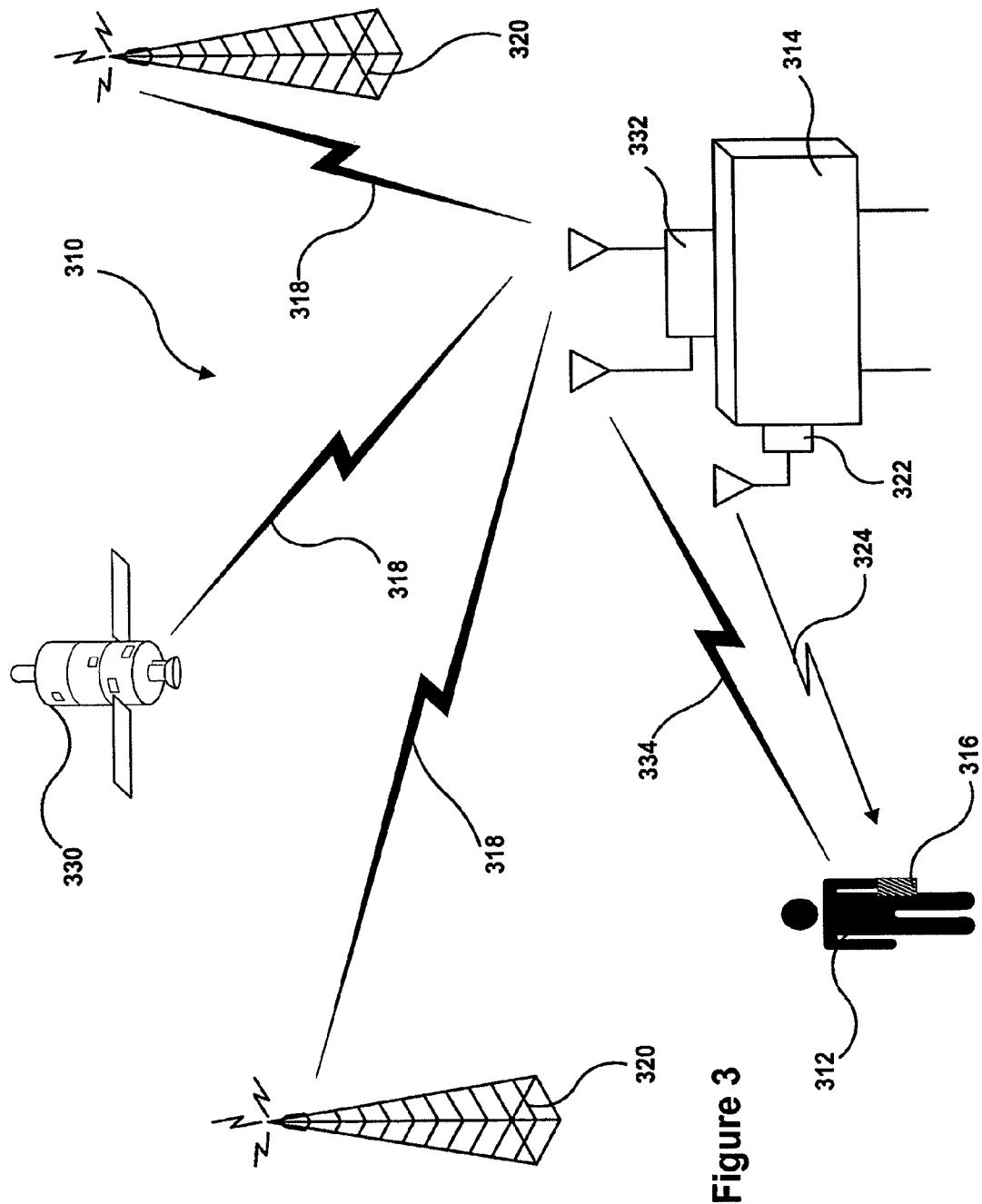
FIG. 3 is a schematic diagram illustrating a system and method for measuring the exposure of a survey participant to a media display in accordance with certain embodiments of the present invention.

Referring now to FIG. 3 a system 310 for measuring the exposure of a survey participant 312 to a media display 314 in accordance with certain embodiments of the present invention is schematically shown. System 310 includes a portable monitor 316 arranged to be carried on the person of the survey participant 312. System 310 also includes a media display location receiver/transmitter 332 on or adjacent the media display 314. The media display location receiver/transmitter 332 receives one or more position indicative signals 318 from one or more terrestrial sources 320 and/or satellite-based sources 330 and generates media display location data indicative of a location of the media display 314 based upon the signals 318. The media display location data is transmitted as a media display location signal 334 by the media display location receiver/transmitter 332, which media display location signal 334 is received by the portable monitor 316 carried by the survey participant 312.

The media display location data received in the media display location signal 334 are analyzed in conjunction with stored media display data that represent media display locations and/or locations from which persons are able to view media displays, to evaluate the exposure of the survey participant 312 to one or more media displays 314. This analysis may be performed by the portable monitor 316 and/or by a processing system to which the portable monitor 316 has communicated the location data. The processes of generating and analyzing the location data are described in more detail below.

The media display location receiver/transmitter 332 may employ satellite-based techniques, such as global positioning system (GPS) and/or server assisted GPS technology, and/or terrestrial techniques, such as an angle of arrival (AOA) technique, a time difference of arrival (TDOA) technique, an enhanced signal strength (ESS) technique, a location fingerprinting technique, and/or an ultra wideband location technique to generate the media display location data based upon the signals 318. Each of these techniques has been briefly described above.

The media display location signal 334 may be transmitted at a different frequency than, in a different format than, or both at a different frequency than and in a different format than the position indicative signals 318 received from the terrestrial sources 320 and/or the satellite-based sources 330. This may be desirable in that the receivers, processors and related components necessary to process certain types of signals (such as RF signals, acoustic signals, infrared (IR) signals, microwave signals, etc.) may be smaller than, less costly than, use less power than, and/or have some other advantage over the components necessary to receive and process the position indicative signals 318. As such, it may be desirable to transmit the media display location signals 334 using one of these formats so as to reduce the size of, weight of, power consumption of and/or cost of the portable monitor 316. In certain advantageous embodiments, the media display location signal 334 is communicated acoustically in the same manner as the location data is communicated from the vehicle monitor 228 to the portable monitor in the embodiments of FIG. 2.

As with the system 110 described in FIG. 1, system 310 may optionally employ certain power conservation techniques in order to conserve battery life of the portable monitor 316. More specifically, either of the exemplary techniques described above, involving the generation of location data periodically or from time to time and/or employing a transmitter 322 which transmits a monitor enabling signal 324 and generating location data only when the monitor enabling signal 324 is received, may be employed.

Figure 4:
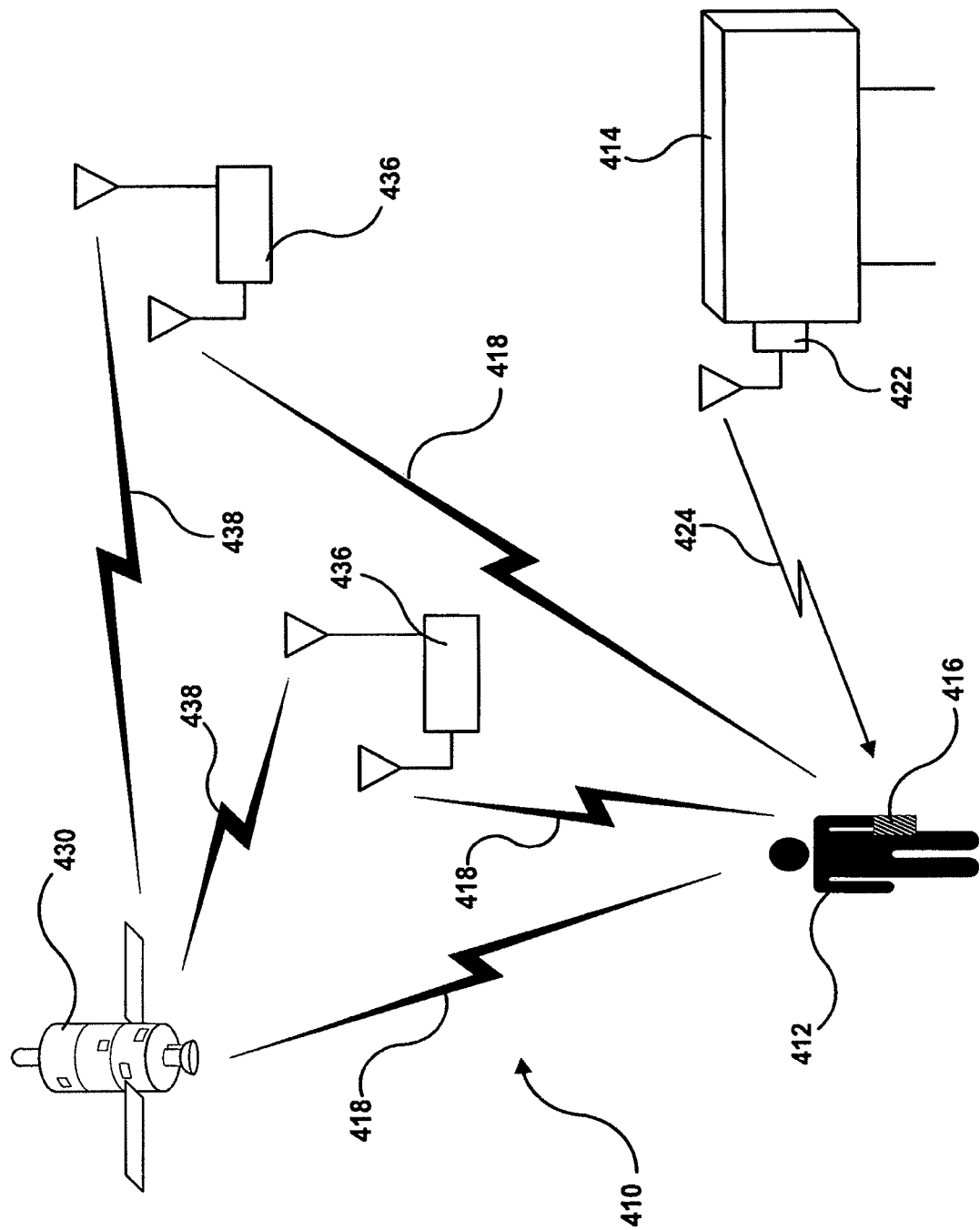
FIG. 4 is a schematic diagram illustrating a system and method for measuring the exposure of a survey participant to a media display in accordance with certain embodiments of the present invention.

FIG. 4 schematically illustrates a system 410 for measuring the exposure of a survey participant 412 to a media display 414 in accordance with certain embodiments of the present invention. Similar to the system 110 shown in FIG. 1, system 410 includes a portable monitor 416 arranged to be carried on the person of the survey participant 412, which portable monitor 416 receives one or more signals 418 and generates location data indicative of a location of the portable monitor 416 based upon the signals 418. However, rather than signals 418 being solely terrestrial in nature, signals 418 are produced by a server-assisted GPS technique, which, as described in more detail above, involves the positioning of stationary servers 436 throughout the area of coverage to receive signals 438 from satellites 430, to process such signals 438, and to assist portable monitor 416 to acquire the GPS signals from one or more satellites 430. Thus, signals 418 are received from both servers 436 and satellite 430.

The location data generated by the portable monitor 416 and server-assisted GPS servers are analyzed in conjunction with stored media display data that represent media display locations and/or locations from which persons are able to view media displays, to evaluate the exposure of the survey participant 412 to one or more media displays 414. This analysis may be performed by the portable monitor 416 and/or by a processing system to which the portable monitor 416 has communicated the location data. The processes of generating and analyzing the location data are described in more detail below.

As with the system 110 described in FIG. 1, system 410 may optionally employ certain power conservation techniques in order to conserve battery life of the portable monitor 416. More specifically, either of the exemplary techniques described above, involving the generation of location data periodically or from time to time and/or employing a transmitter 422 which transmits a monitor enabling signal 424 and generating location data only when the monitor enabling signal 424 is received, may be employed.

Figure 5:
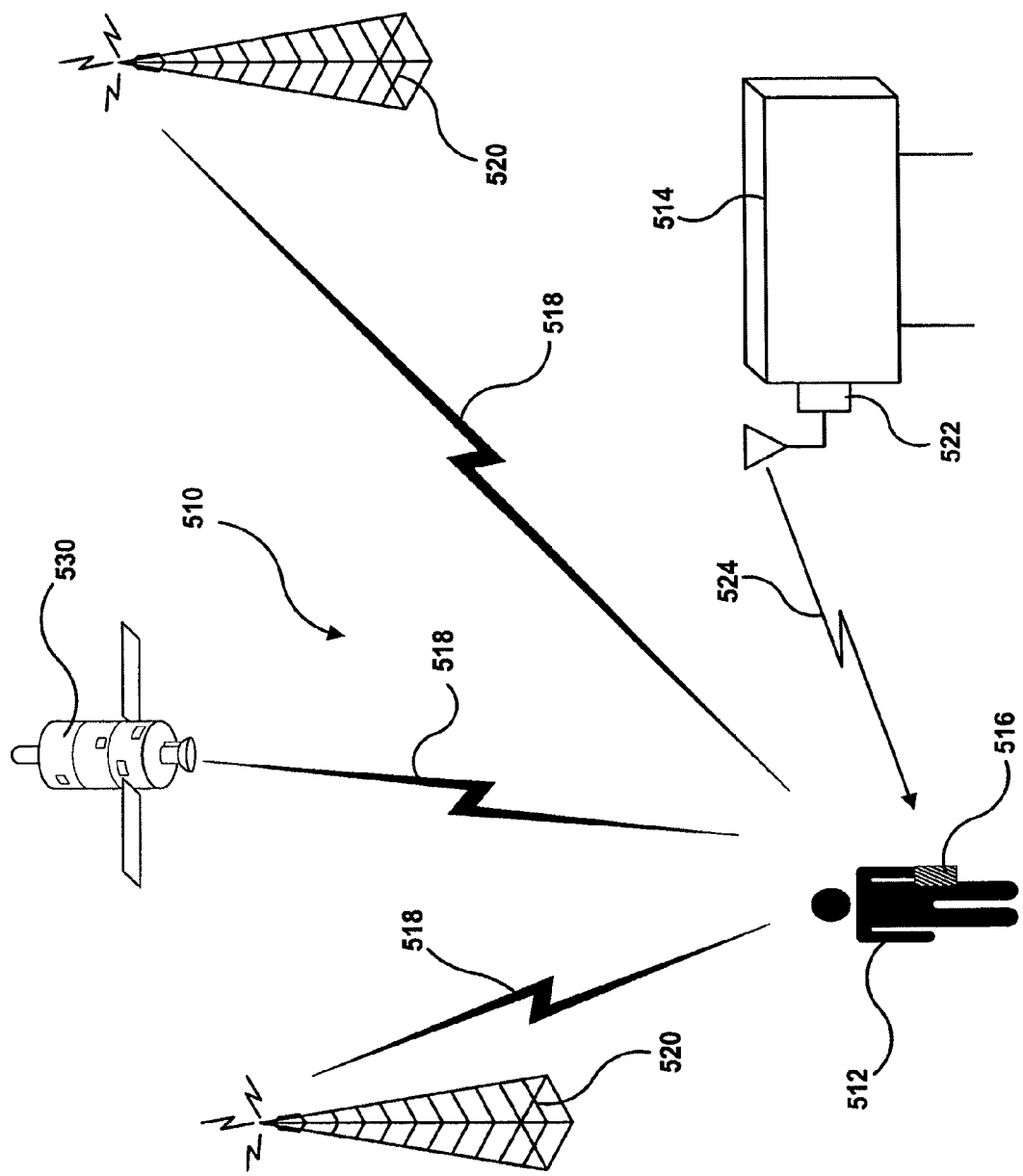
FIG. 5 is a schematic diagram illustrating a system and method for measuring the exposure of a survey participant to a media display in accordance with certain embodiments of the present invention.

Referring now to FIG. 5 a system 510 for measuring the exposure of a survey participant 512 to a media display 514 in accordance with certain embodiments of the present invention is schematically shown. Similar to the system 110 shown in FIG. 1, system 510 includes a portable monitor 516 arranged to be carried on the person of the survey participant 512, which portable monitor 516 receives one or more signals 518 from one or more terrestrial sources 520 and/or satellite sources 530, and generates location data indicative of a location of the portable monitor 516. However, rather than the location data being generated based upon the received signals 518, the location data is generated based upon signals produced by an inertial monitoring unit which forms a part of portable monitor 516. The received signals 518 are used to provide location calibration data to the inertial monitoring unit as without such calibration, measurement errors which are cumulative over time may lead to erroneous location data being generated. Such calibration, which is described more fully below, may be performed periodically or from time to time, or whenever the signals 518 are received.

The inertial monitoring unit preferably is small in size and lightweight. An advantageous embodiment of such an inertial monitoring-unit employs microelectromechanical sensors (MEMS) as either gyroscopic sensors and/or accelerometers to provide data from which the location of the monitor can be determined.

The portable monitor 516 may employ satellite-based techniques, such as global positioning system (GPS) and/or server assisted GPS technology, and/or terrestrial techniques, such as an angle of arrival (AOA) technique, a time difference of arrival (TDOA) technique, an enhanced signal strength (ESS) technique, a location fingerprinting technique, and/or an ultra wideband location technique to produce the location calibration data based upon the signals 518. Each of these techniques has been briefly described above.

The location data generated by the portable monitor 516 are analyzed in conjunction with stored media display data that represent media display locations and/or locations from which persons are able to view media displays, to evaluate the exposure of the survey participant 512 to one or more media displays 514. This analysis may be performed by the portable monitor 516 and/or by a processing system to which the portable monitor 516 has communicated the media display location data. The processes of generating and analyzing the location data are described in more detail below.

As with the system 110 described in FIG. 1, system 510 may optionally employ certain power conservation techniques in order to conserve battery life of the portable monitor 516. More specifically, either of the exemplary techniques described above, involving the generation of location data periodically or from time to time and/or employing a transmitter 522 which transmits a monitor enabling signal 524 and generating location data only when the monitor enabling signal 524 is received, may be employed.

Figure 6:
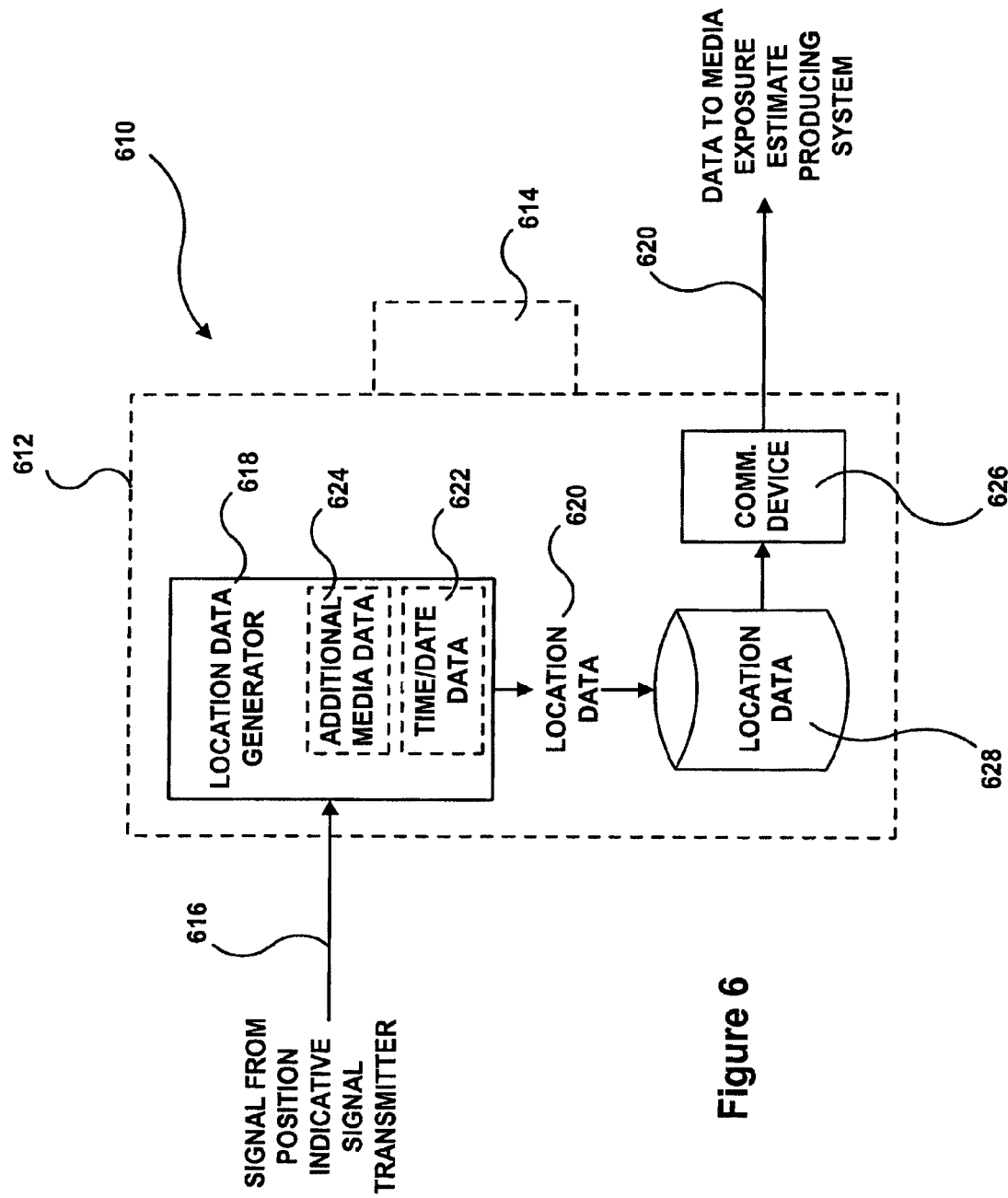
FIG. 6 is a block diagram illustrating certain embodiments of a portable monitor portion of a system and method for measuring the exposure of a survey participant to a media display in accordance with certain embodiments of the present invention.

Referring now to FIG. 6, a portable monitor 610 portion of a system and method for measuring the exposure of a survey participant to a media display in accordance with certain embodiments of the present invention is shown. Portable monitor 610 is limited in size and configured to be carried about by a survey participant. The portable monitor 610 in certain embodiments is housed in a housing 612, and may be packaged similarly to a pager, cell phone, PDA or portable media player device. The portable monitor 610 in certain embodiments includes a clip, pin, belt loop, band, chain or other appropriate means 614 for affixing it to a belt, strap, shirt, blouse or other part of the survey participant's clothing or directly to the survey participant. In certain embodiments, the portable monitor 610 is packaged in a wrist watch, article of jewelry or in any other article or device of a kind which is or may be carried about. In other embodiments, the portable monitor includes means 614 for mounting the portable monitor 610 on or in a vehicle in which the survey participant is traveling, such as a clip for attachment to a visor, a loop for attachment to a key ring, a magnet, a clamp, a screw or a hook-and-loop fastening system for allowing the portable monitor 610 to be detachably connected to the dash or window of the vehicle or elsewhere on or in the vehicle.

The portable monitor 610 receives one or more position indicative signals 616 from one or more position indicative signal transmitters, whether they be terrestrial signal transmitters, satellite-based signal transmitters, or a combination of the two, as discussed in more detail above. The signals 616 are used by a location data generator 618 to generate location data 620 indicating geographically where the survey participant has been. In certain embodiments, the location data 620 is supplemented with additional data, such as time/date data 622 indicative of when the survey participant was at each location and/or additional media data 624 indicative of additional media (such as radio, television and/or streaming media) to which the survey participant was exposed. In certain ones of such embodiments, the additional media data represents media data identification codes embedded in acoustic media data and/or acoustic media data from which such codes or signatures representing the acoustic media data, are produced. The acoustic media data are received and transduced by a microphone of the monitor 612 and decoded therefrom by a decoder thereof (such microphone and decoder not being shown for purposes of simplicity and clarity).

The portable monitor 610 also includes a communications device 626 which communicates the location data 620 (as well as the time/date data 622 and/or the additional media data 624 in embodiments wherein such data is provided) to a media exposure estimate producing system for producing media exposure data based upon the location data 620, along with the further communicated data. The communications device 626 may communicate the location data 620 to the media exposure estimate producing system by any of numerous means, either by wire or wireless, such as by way of telephone lines, data lines, fiber-optic lines, wireless optical transmissions, acoustic transmissions, radio transmissions, cell-phone networks, pager networks, etc.

In certain embodiments, the communications device 626 communicates the location data 620 to the media exposure estimate producing system in real time (i.e., as the location data 620 is generated). In other embodiments, the portable monitor 610 includes a memory 628, such as a solid state memory or a magnetically or optically readable storage medium, onto which the location data 620 is stored as it is received. In these various embodiments, the communications device 626 is operative to communicate the stored location data 620 to the media exposure estimate producing system in real time, from time to time and/or periodically.

Figure 7:
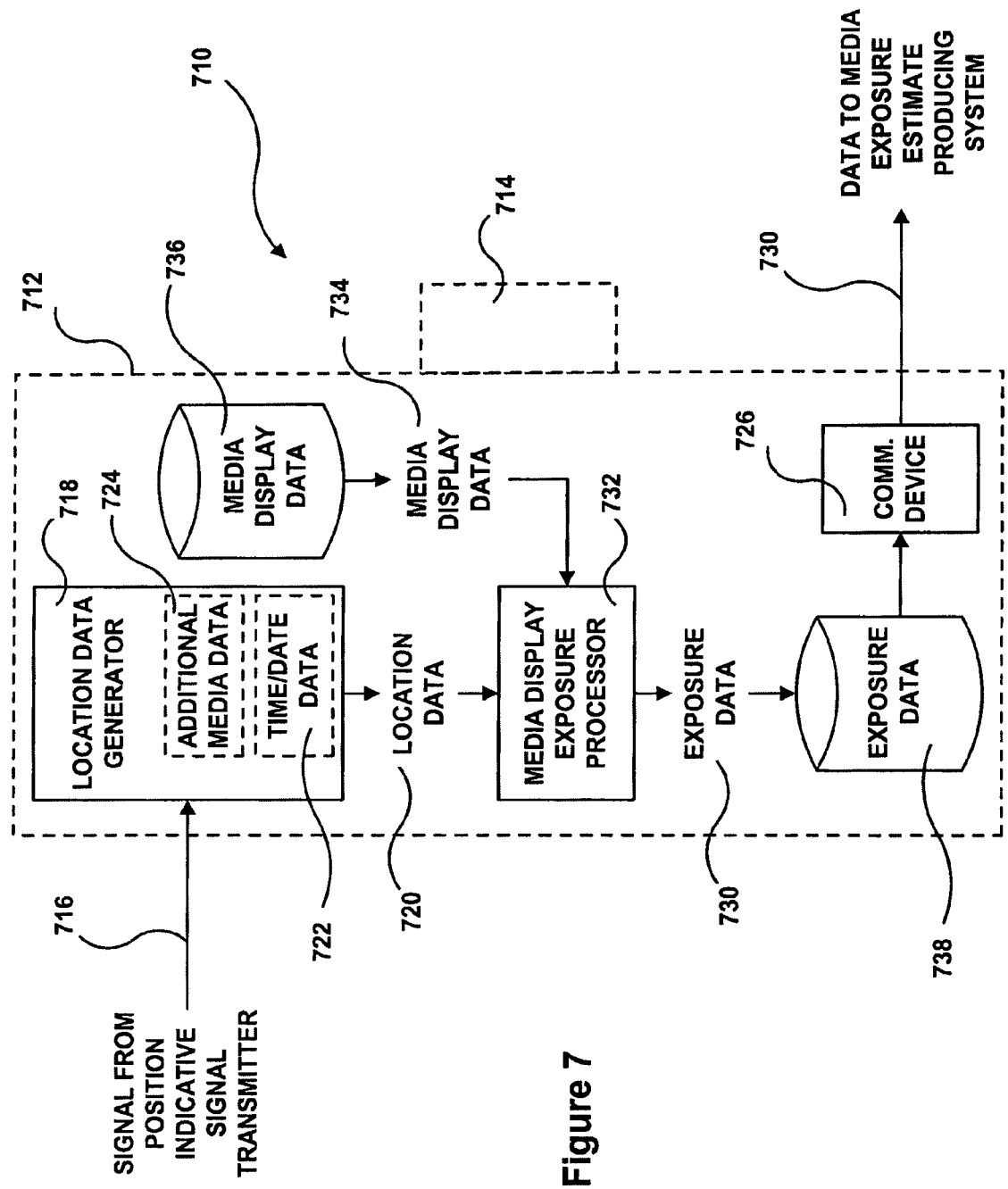
FIG. 7 is a block diagram illustrating certain embodiments of a portable monitor portion of a system and method for measuring the exposure of a survey participant to a media display in accordance with certain embodiments of the present invention.

FIG. 7 illustrates a portable monitor 710 portion of a system and method for measuring the exposure of a survey participant to a media display in accordance with certain embodiments of the present invention. Several elements of the portable monitor 710, including the housing 712, the optional attachment means 714, the position indicative signal 716, the location data generator 718, the location data 720, the time/date data 722, the additional media data 724 and means for producing it, and the communications device 726, are substantially similar in form and function to the similarly named and numbered elements of the portable monitor 610 shown in FIG. 6 and described above. As such, these elements are not again described in detail.

However, the portable monitor 710 includes additional functionality for further processing the location data 720 to create exposure data 730. Unlike location data 720 which is indicative of the geographical locations to which the survey participant has traveled, the exposure data 730 indicates the media display or displays to which the survey participant has been exposed, how many times the survey participant has been exposed thereto, and if the date/time data 722 is generated, at what dates and times the survey participant was exposed to such display or displays.

This additional functionality is achieved by a media display exposure processor 732 which receives the location data 720 from the location data generator 718 and which receives media display data 734 which is stored in a media display memory 736. The media display data 734 is indicative of the geographical locations of the media display or displays to which exposure is to be measured, as well as various rules which define whether the survey participant has been exposed to each media display. These rules, for example may require that in order for an exposure to be determined the survey participant must have passed within a certain distance of the media display (the size of the media display perhaps dictating the required distance), must have been traveling in a certain direction (which may be dictated by the direction in which the media display is facing), must have been traveling at a certain time of day (i.e., the media display may change over time and/or may only be viewable during daylight or nighttime hours, etc.), etc. Many other rules may be applicable. As should be recognized, at least some of the rules may be global rules applicable to all media displays, while at least some rules may be specific to individual media displays.

The media display exposure processor 732 analyzes the location data 732 in conjunction with the geographical locations of the media display or displays to which exposure is to be measured (as contained in the media display data 734), and determines that the survey participant has been exposed to one or more media displays if this information correlates within the parameters specified in the rules contained in the media display data 734. If such an exposure is determined, exposure data 730 indicative of such is generated. As is the case with the location data 620 of the portable monitor 610 discussed above, the communications device 726 of portable monitor 710 may communicate the exposure data 730 to the media exposure estimate producing system in real time (i.e., as the exposure data 730 is generated), or the exposure data 730 may be stored in a memory 738 for later communication. In certain embodiments the functions of the location data generator 718 and the media display exposure processor 732 are carried out by a single processor, while in other embodiments their respective functions are carried out by separate processors.

Figure 8:
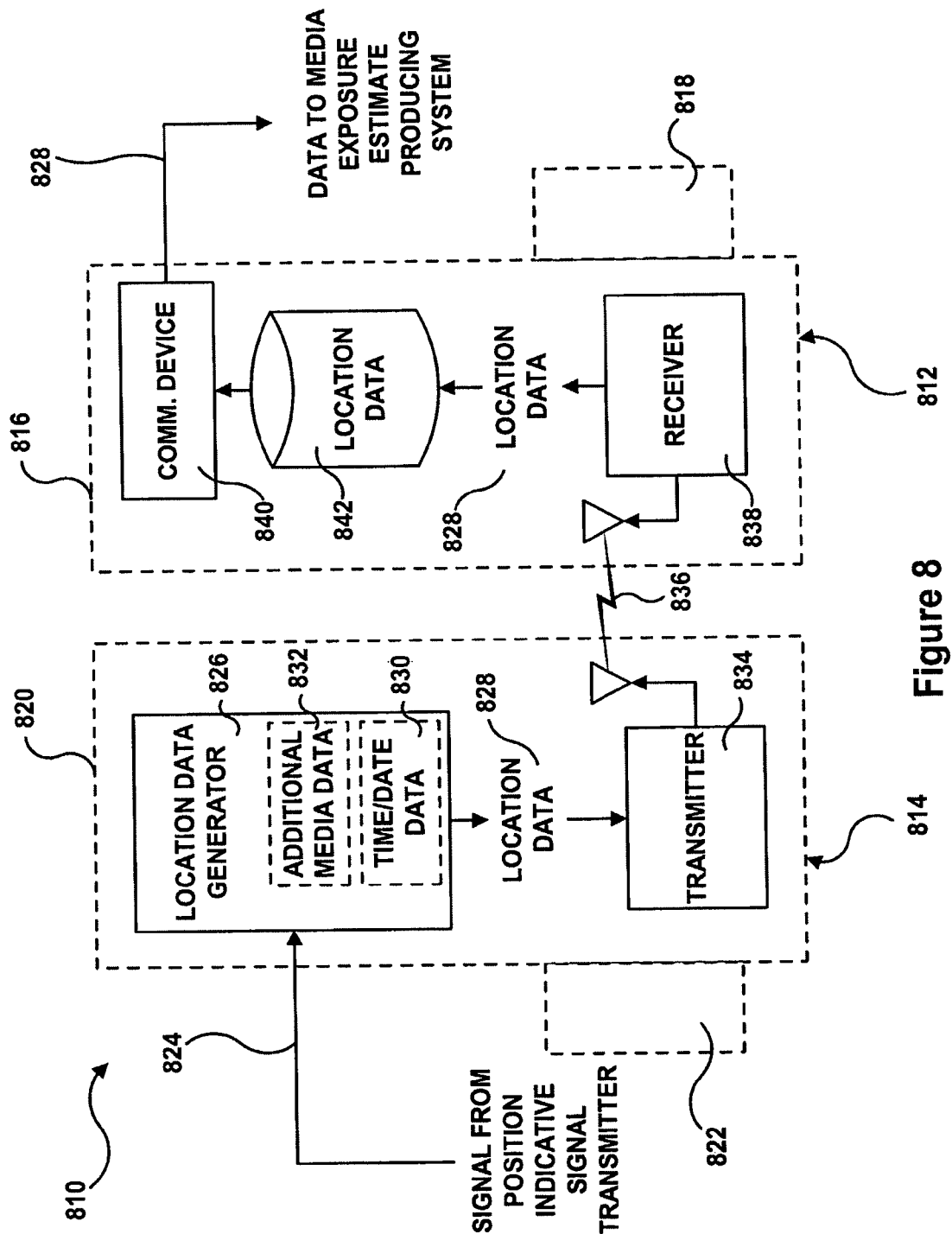
FIG. 8 is a block diagram illustrating certain embodiments of a portable monitor portion and a vehicle monitor portion of a system and method for measuring the exposure of a survey participant to a media display in accordance with certain embodiments of the present invention.

FIG. 8 illustrates certain embodiments of a portable monitor 812 portion and a vehicle monitor portion 814 of a system 810 and method for measuring the exposure of a survey participant to a media display in accordance with certain embodiments of the present invention.

Portable monitor 812 is limited in size and configured to be carried about by a survey participant. The portable monitor 812 in certain embodiments is housed in a housing 816, and may be packaged similarly to a pager, cell phone, PDA or portable media player device. The portable monitor 812 in certain embodiments includes a clip, pin, belt loop, band, chain or other appropriate means 818 for affixing it to a belt, strap, shirt, blouse or other part of the survey participant's clothing or directly to the survey participant. In certain embodiments, the portable monitor 812 is packaged in a wrist watch, article of jewelry or in any other article or device of a kind which is or may be carried about. In other embodiments, the portable monitor 812 includes means 818 for mounting the portable monitor 812 on or in a vehicle in which the survey participant is traveling, such as a clip for attachment to a visor, a loop for attachment to a key ring, a magnet, a clamp, a screw or a hook-and-loop fastening system for allowing the portable monitor 812 to be detachably connected to the dash or window of the vehicle or elsewhere on or in the vehicle.

Vehicle monitor 814 is configured to be mounted on or in a vehicle. The vehicle may comprise a private vehicle, such as an automobile, a truck, a van, a motorcycle, a bicycle, a scooter, or the like, or may comprise a public vehicle, such as a train, a bus, a subway car, an airplane, a monorail or the like. The vehicle monitor 814 in certain embodiments is housed in a housing 820, and in certain embodiments, the vehicle monitor 814 includes means 822 for mounting the vehicle monitor 814 on or in the vehicle.

The vehicle monitor 814 receives one or more position indicative signals 824 from one or more position indicative signal transmitters, whether they be terrestrial signal transmitters, satellite-based signal transmitters, or a combination of the two, as discussed in more detail above. The signals 824 are used by a location data generator 826 to generate location data 828 indicating where the vehicle (and thus the survey participant riding in the vehicle) has been geographically. The location data 828 may be supplemented with additional data, such as time/date data 830 indicating when the survey participant was at each location and/or additional media data 832 indicating additional media (such as radio, television or streaming media) to which the survey participant was exposed.

The vehicle monitor 814 also includes a signal transmitter 834 which generates and transmits a signal 836 containing the location data 828 generated by the location data generator 826 as well as the time/date data 830 and/or the additional media data 832 in embodiments wherein such data is provided. In certain ones of such embodiments, the additional media data represents media data identification codes embedded in acoustic media data received and transduced by a microphone of the monitor 814 and decoded therefrom by a decoder thereof (such microphone and decoder not being shown for purposes of simplicity and clarity). In certain alternate embodiments, the additional media data is produced by appropriate means included in portable monitor 812. The signal 836 may be an acoustic signal, an RF signal, an IR signal or any other signal appropriate for transmission, preferably wireless transmission. Where the signal 836 is acoustic, preferably it is masked as described above in connection with FIG. 2.

The portable monitor 812 includes a signal receiver 838 adapted to receive the signal 836 transmitted by the transmitter 834 of the vehicle monitor 814, and to extract the location data 828 therefrom. The portable monitor 812 also includes a communications device 840 which communicates the location data 828 extracted from the signal 836 to a media exposure estimate producing system for producing media exposure data based upon the location data 828. The communications device 840 may communicate the location data 828 to the media exposure estimate producing system by any of numerous means, either by wire or wireless, such as by way of telephone lines, data lines, fiber-optic lines, radio transmissions, infrared transmission, acoustic transmission, cell-phone networks, pager networks, etc.

In certain embodiments, the communications device 840 communicates the location data 828 to the media exposure estimate producing system in real time (i.e., as the location data 828 is received by receiver 838). In other embodiments, the portable monitor 812 includes a memory 842, such as a solid state memory or a magnetically or optically readable storage medium, in which the location data 828 is stored as it is received. In these various embodiments, the communications device 840 is operative to communicate the stored location data 828 to the media exposure estimate producing system in real time, from time to time and/or periodically.

Figure 9:
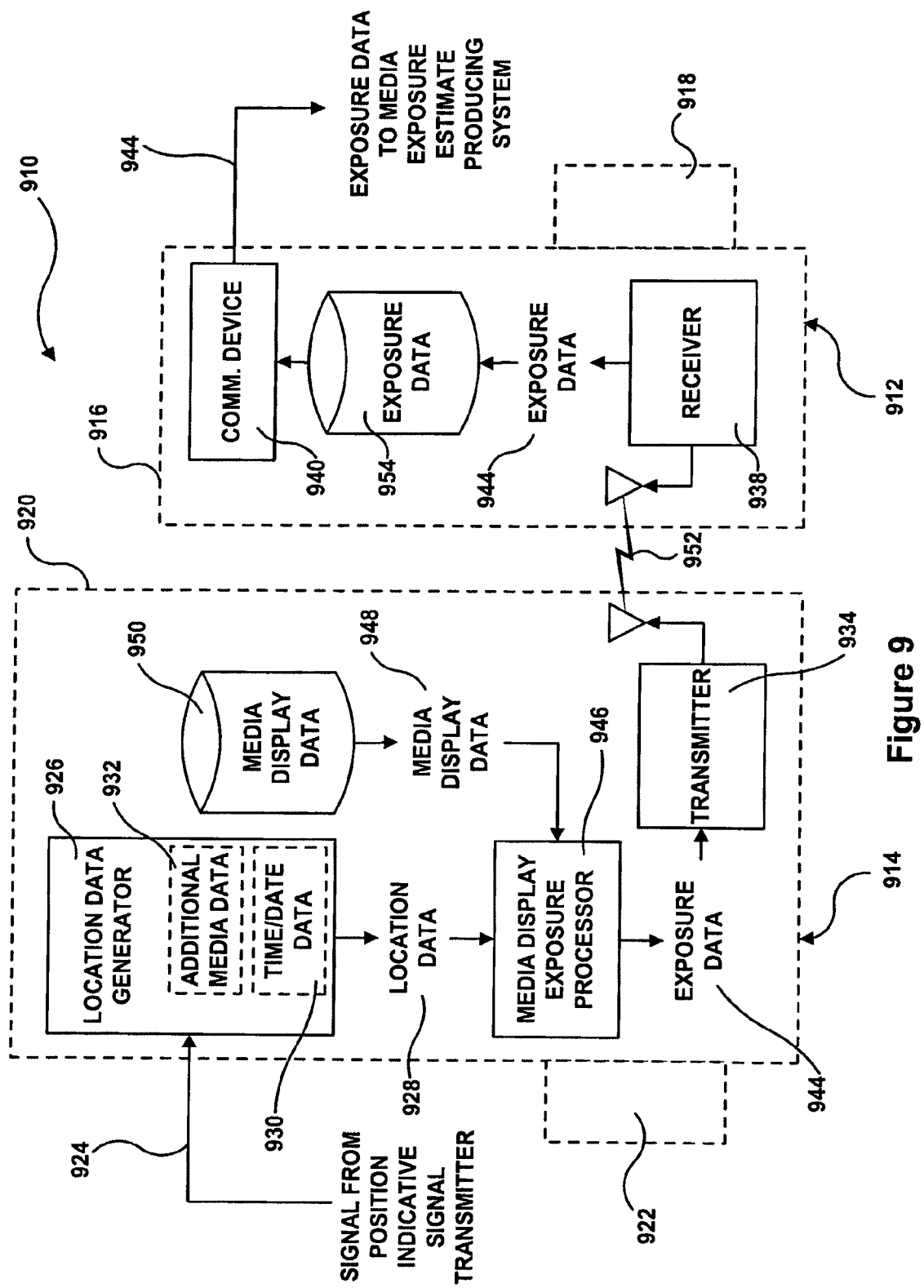
FIG. 9 is a block diagram illustrating certain embodiments of a portable monitor portion and a vehicle monitor portion of a system and method for measuring the exposure of a survey participant to a media display in accordance with certain embodiments of the present invention.

FIG. 9 illustrates certain embodiments of a portable monitor 912 portion and a vehicle monitor portion 914 of a system 910 and method for measuring the exposure of a survey participant to a media display in accordance with certain embodiments of the present invention.

Several elements of the vehicle monitor 914, including the housing 920, the optional attachment means 922, the position indicative signal 924, the location data generator 926, the location data 928, the time/date data 930, the additional media data 932 and the signal transmitter 934, are substantially similar in form and function to the similarly named and numbered elements of the vehicle monitor 814 shown in FIG. 8 and described above. Similarly, several elements of the portable monitor 912, including the housing 916, the optional attachment means 918, the signal receiver 938 and communications device 940, are substantially similar in form and function to the similarly named and numbered elements of the portable monitor 812 shown in FIG. 8 and described above. As such, these elements are not again described in detail.

However, the vehicle monitor 914 includes additional functionality for further processing the location data 928 to create exposure data 944. Unlike location data 928 which is indicative of the geographical locations to which the survey participant has traveled, the exposure data 944 is indicative of the media display or displays to which the survey participant has been exposed, how many times the survey participant has been exposed thereto, and if the date/time data 930 is generated, at what dates and times the survey participant was exposed thereto.

This additional functionality is achieved by a media display exposure processor 946 which receives the location data 928 from the location data generator 926 and which receives media display data 948 which is stored in a media display memory 950. The media display data 948 is indicative of the geographical locations of the media display or displays to which exposure is to be measured, as well as various rules which define whether the survey participant has been exposed to each media display. These rules, for example may require that in order for an exposure to be determined the survey participant must have passed within a certain distance of the media display (the size of the media display perhaps dictating the required distance), must have been traveling in a certain direction (which may be dictated by the direction in which the media display is facing), must have been traveling at a certain time of day (i.e., the media display may change over time and/or may only be viewable during daylight or nighttime hours, etc.), etc. Many other rules may be applicable. As should be recognized, at least some of the rules may be global rules applicable to all media displays, while at least some rules may be specific to individual media displays.

The media display exposure processor 946 analyzes the location data 928 in conjunction with the geographical locations of the media display or displays to which exposure is to be measured (as contained in the media display data 948), and determines that the survey participant has been exposed to one or more media displays if this information correlates within the parameters specified in the rules contained in the media display data 948. If such an exposure is determined, exposure data 944 indicative of such is generated. Similar to the case with the vehicle monitor 814 discussed above, the signal transmitter 934 generates and transmits a signal 952 containing the exposure data 944, which signal 952 is received by the signal receiver 938 of the portable monitor 912. As is the case with the portable monitor 812 discussed above, the communications device 940 of portable monitor 912 may communicate the exposure data 944 to the media exposure estimate producing system in real time (i.e., as the exposure data 944 is received), or the exposure data 944 may be stored in a memory 954 for later communication. In either case, time and date data as well as additional media data, if available, is also communicated with the exposure data 944.

Figure 10:
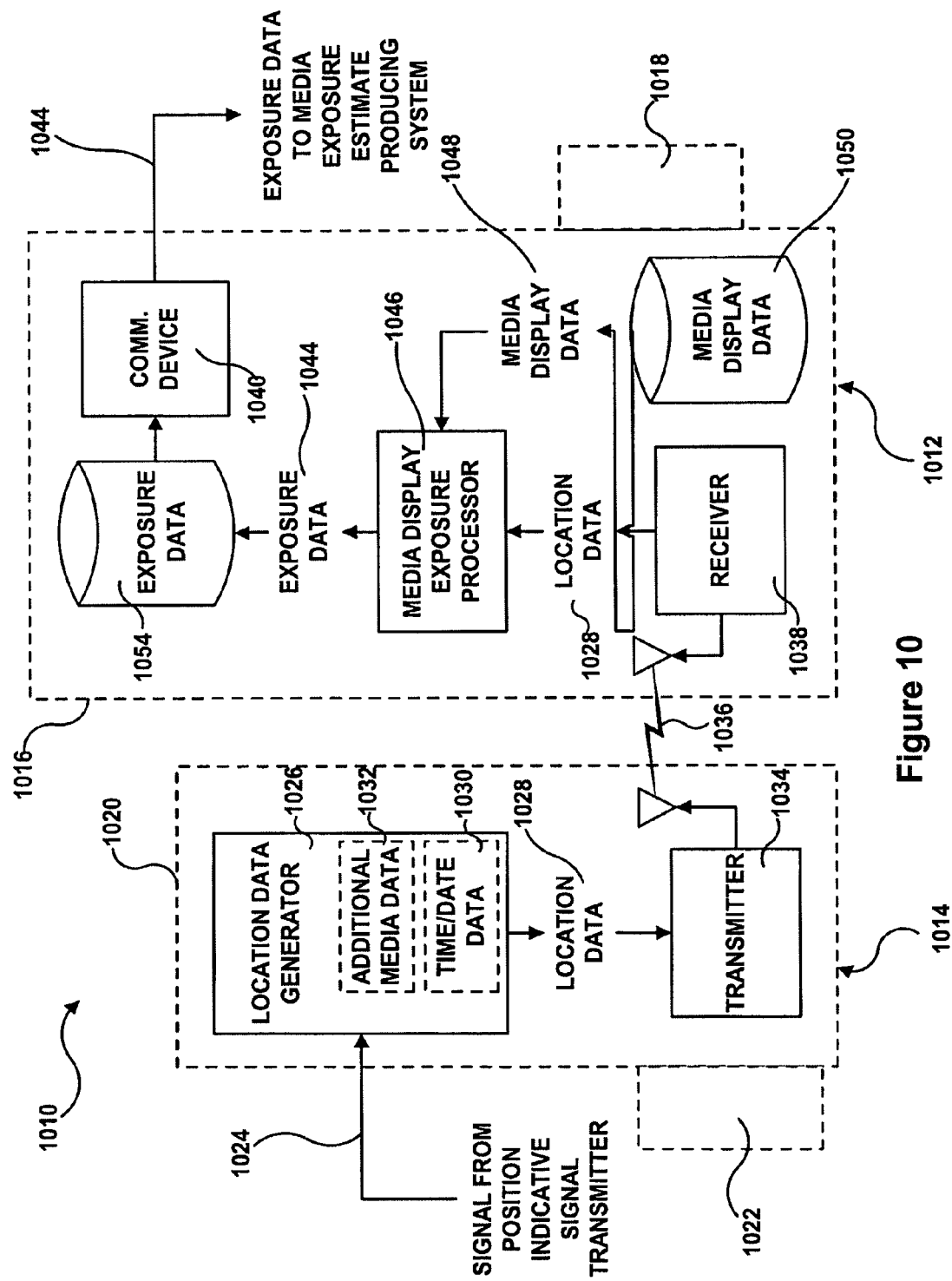
FIG. 10 is a block diagram illustrating certain embodiments of a portable monitor portion and a vehicle monitor portion of a system and method for measuring the exposure of a survey participant to a media display in accordance with certain embodiments of the present invention.

FIG. 10 illustrates certain embodiments of a portable monitor 1012 portion and a vehicle monitor portion 1014 of a system 1010 and method for measuring the exposure of a survey participant to a media display in accordance with certain embodiments of the present invention.

Several elements of the vehicle monitor 1014, including the housing 1020, the optional attachment means 1022, the position indicative signal 1024, the location data generator 1026, the location data 1028, the time/date data 1030, the additional media data 1032, the signal transmitter 1034 and the transmitted signal 1036, are substantially similar in form and function to the similarly named and numbered elements of the vehicle monitor 814 shown in FIG. 8 and described above. Similarly, several elements of the portable monitor 1012, including the housing 1016, the optional attachment means 1018, the signal receiver 1038 and communications device 1040, are substantially similar in form and function to the similarly named and numbered elements of the portable monitor 1012 shown in FIG. 8 and described above. As such, these elements are not again described in detail. In certain embodiments, the additional media data 1032 represents media data identification codes embedded in acoustic media data received and transduced by a microphone of the monitor 1014 and decoded therefrom by a decoder thereof (such microphone and decoder not being shown for purposes of simplicity and clarity). In certain alternate embodiments, the additional media data is produced by appropriate means included in portable monitor 1012.

The portable monitor 1012 includes additional functionality for further processing the location data 1028 received from the vehicle monitor 1014 to create exposure data 1044. Unlike location data 1028 which is indicative of the geographical locations to which the survey participant has traveled, the exposure data 1044 is indicative of the media display or displays to which the survey participant has been exposed, how many times the survey participant has been exposed thereto, and if the date/time data 1030 is generated, at what dates and times the survey participant was exposed thereto.

This additional functionality is achieved by a media display exposure processor 1046 which receives the location data 1028 from the signal receiver 1038 and which receives media display data 1048 which is stored in a media display memory 1050. The media display data 1048 is indicative of the geographical locations of the media display or displays to which exposure is to be measured, as well as various rules which define whether the survey participant has been exposed to each media display. These rules, for example may require that in order for an exposure to be determined the survey participant must have passed within a certain distance of the media display (the size of the media display perhaps dictating the required distance), must have been traveling in a certain direction (which may be dictated by the direction in which the media display is facing), must have been traveling at a certain time of day (i.e., the media display may change over time and/or may only be viewable during daylight or nighttime hours, etc.), etc. Many other rules may be applicable. As should be recognized, at least some of the rules may be global rules applicable to all media displays, while at least some rules may be specific to individual media displays.

The media display exposure processor 1046 analyzes the location data 1028 in conjunction with the geographical locations of the media display or displays to which exposure is to be measured (as contained in the media display data 1048), and determines that the survey participant has been exposed to one or more media displays if this information correlates within the parameters specified in the rules contained in the media display data 1048. If such an exposure is determined, exposure data 1044 indicative of such is generated. As is the case with the portable monitor 812 discussed above, the communications device 1040 of portable monitor 1012 may communicate the exposure data 1044 to the media exposure estimate producing system in real time (i.e., as the exposure data 1044 is generated), or the exposure data 1044 may be stored in a memory 1054 for later communication. In either case, additional media data, if available, is also communicated with the exposure data 944.

Figure 11:
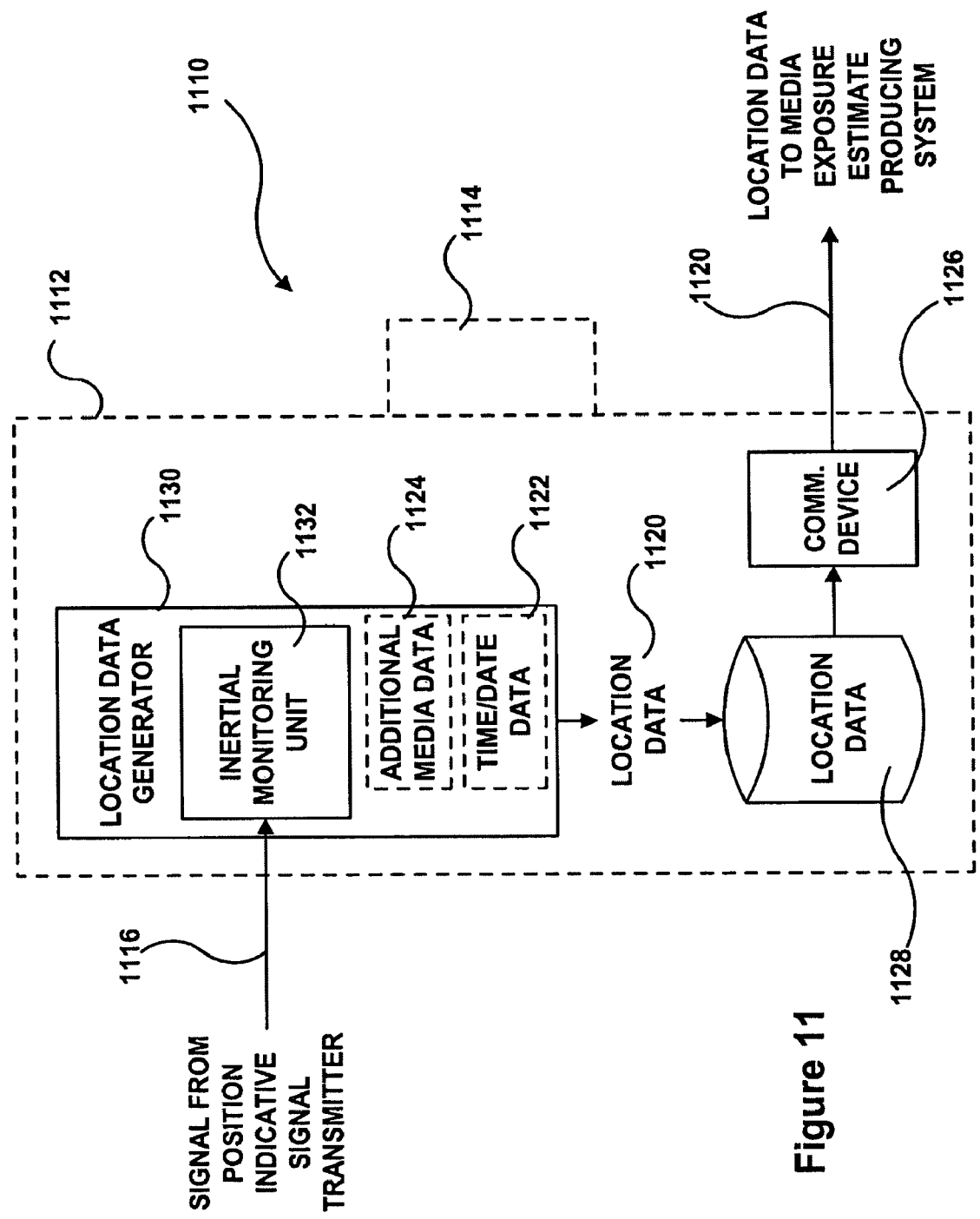
FIG. 11 is a block diagram illustrating certain embodiments of a portable monitor portion of a system and method for measuring the exposure of a survey participant to a media display in accordance with certain embodiments of the present invention.

FIG. 11 illustrates a portable monitor 1110 portion of a system and method for measuring the exposure of a survey participant to a media display in accordance with certain embodiments of the present invention.

Several elements of the portable monitor 1110, including the housing 1112, the optional attachment means 1114, the position indicative signal 1116, the location data 1120, the time/date data 1122, the additional media data 1124 and the means for producing the same, the communications device 1126 and the location data memory 1128, are substantially similar in form and function to the similarly named and numbered elements of the portable monitor 610 shown in FIG. 6 and described above. As such, these elements are not again described in detail. In certain embodiments, the additional media data 1124 represents media data identification codes embedded in acoustic media data received and transduced by a microphone of the monitor 1112 and decoded therefrom by a decoder thereof (such microphone and decoder not being shown for purposes of simplicity and clarity).

However, the location data generator 1130 of the portable monitor 1110 of the embodiment shown in FIG. 11 is different than the location data generators 618, 718, 826, 926, 1026 discussed in connection with previous embodiments in at least one significant respect. Rather than location data generator 1130 generating location data 1120 based upon signals 1116, location data generator 1130 includes an inertial monitoring unit 1132, and location data 1120 is generated based upon signals generated by this inertial monitoring unit 1132.

As is known in the art, inertial motion measurement methods depend on orthogonally mounted inertial rate sensors and orthogonally mounted accelerometers to obtain multi-axis rate and acceleration measurement signals. In certain advantageous embodiments, the inertial monitoring unit 1132 employs microelectromechanical sensors (MEMS) as gyroscopic sensors and/or accelerometers to provide data from which the location of the monitor can be determined.

These signals, in combination with information concerning the user's position at a particular time can be used to compute the user's location at any other particular time. Inertial monitoring unit 1132 employs these principals to generate location data 1120.

However, also as known in the art, because the computation of the user's location is based upon cumulative rate and location measurements, errors in these measurements are also cumulative. For example, if a user begins tracking his/her location in the morning using an inertial monitoring unit, by the end of the day even slight errors introduced at each leg of the user's journey can add up such that the user's calculated position at the end of the day may be significantly different than the user's actual position. This problem may be obviated, however, if the inertial monitoring unit is calibrated throughout the day. This may be accomplished any time the user's actual position is known. Essentially, the inertial monitoring unit is "reset", and rate and acceleration measurements can begin anew from this known location.

Inertial monitoring unit 1132 of the present invention employs position indicative signals 1116 to so calibrate itself, and in various embodiments employs one or more of the position indicative signals described above for this purpose. Such calibration may be performed periodically or from time to time, or whenever the signals 1116 are received. Inertial monitoring unit 1132 thus allows the survey participant's movements to be tracked even in locations where signals 1116 are not available (such as in buildings, in subways, in rural areas, etc.), while allowing calibration to be performed where signals 1116 are available.

It should be recognized that a location data generator which generates location data based upon an inertial monitoring unit, similar to location data generator 1130 of the portable monitor 1110 of the embodiment shown in FIG. 11, may be substituted for any of the location data generators 618, 718, 826, 926, 1026 discussed in connection with previous embodiments.

When the media exposure estimate producing system in each of the above embodiments receives the location data and/or the exposure data from the communications device of each portable monitor, it produces data estimating exposure to media displays in order to produce reports of interest to media display owners, advertisers, broadcasters, cablecasters, on-line services, content providers, and the like. If location data (as opposed to exposure data) is received by the media exposure estimate producing system, it is first processed (similar to the manner described above in connection with certain embodiments which include a media display exposure processor and a media display data memory) in order to produce media display exposure data. The media display exposure data may then be analyzed in connection with additional media data (when provided), such as radio, television or streaming media data, to produce combined media exposure data spanning multiple media formats.

Although various embodiments of the present invention have been described with reference to a particular arrangement of parts, features and the like, these are not intended to exhaust all possible arrangements or features, and indeed many other embodiments, modifications and variations will be ascertainable to those of skill in the art.

What is claimed is:

1. A method comprising the steps of:
generating location data in a portable monitor configured to be carried on the person of a survey participant;
receiving media display data in the portable monitor, said media display data indicating media displays to which the portable monitor was exposed to;
receiving additional media data in the portable monitor, said additional media data indicating exposure of the portable monitor to acoustic audio; and
processing the location data, media display data and additional media data in the portable monitor to evaluate the portable monitor's exposure to media displays and acoustic audio.

2. The method of claim 1 wherein generating location data comprises using satellite-based signals in order to generate the location data.

3. The method of claim 2 wherein the satellite-based signals comprise global positioning system signals.

4. The method of claim 1 wherein generating location data comprises using terrestrial-based signals in order to generate the location data.

5. The method of claim 4 wherein generating location data comprises using a technique comprising at least one of an enhanced signal strength technique, a location fingerprinting technique, and an ultra wideband location technique in order to generate the location data.

6. The method of claim 1 wherein the step of generating location data is performed periodically or from time to time.

7. The method of claim 1, wherein generating location data comprises using a technique comprising at least one of an angle of arrival technique, a time difference of arrival technique, an enhanced signal strength technique, a location fingerprinting technique, and an ultra wideband location technique in order to generate the location data.

8. The method of claim 1 wherein the additional media data is indicative of the survey participant's exposure to one of broadcast or streaming media data.

9. The portable monitoring system of claim 8, wherein the location data generated by the location data generator comprises satellite-based signals.

10. The portable monitoring system of claim 8 wherein the location data generated by the location data generator comprises terrestrial-based signals.

11. The portable monitoring system of claim 8 wherein the location data generator generates location data using a technique comprising at least one of an enhanced signal strength technique, a location fingerprinting technique, and an ultra wideband location technique in order to generate the location data.

12. The portable monitoring system of claim 8 wherein the location data is generated periodically or from time to time.

13. The portable monitoring system of claim 8, wherein the location data generator generates location data using a technique comprising at least one of an angle of arrival technique, a time difference of arrival technique, an enhanced signal strength technique, a location fingerprinting technique, and an ultra wideband location technique in order to generate the location data.

14. The portable monitoring system of claim 8, wherein the additional media data is indicative of the survey participant's exposure to one of broadcast or streaming media data.

15. A portable monitoring system configured to be carried on the person of a survey participant, comprising:
a location data generator for generating location data in the portable monitoring system;
a first input for receiving media display data, said media display data indicating media displays to which the portable monitoring system was, exposed to;
a second input for receiving additional media data, said additional media data indicating exposure of the portable monitoring system to acoustic audio; and
a processor communicatively coupled to the location data generator, the first input and second input, wherein said processor analyzes the location data, media display data and additional media data to evaluate the portable monitor's exposure to media displays and acoustic audio.

16. The portable monitoring system of claim 15 wherein the satellite-based signals comprise global positioning system signals.

\* \* \* \* \*